US008018606B2

(12) United States Patent
Azami

(10) Patent No.: US 8,018,606 B2
(45) Date of Patent: Sep. 13, 2011

(54) COLOR PAGE PRINTER WITH COUNTER

(75) Inventor: Osamu Azami, Shiojiri (JP)

(73) Assignee: Seiko Epson Corporation, Tokyo (JP)

(*) Notice: Subject to any disclaimer, the term of this patent is extended or adjusted under 35 U.S.C. 154(b) by 748 days.

(21) Appl. No.: 12/126,477

(22) Filed: May 23, 2008

(65) Prior Publication Data

US 2008/0291482 A1 Nov. 27, 2008

(30) Foreign Application Priority Data

May 25, 2007 (JP) ................................ 2007-139259

(51) Int. Cl.
*G06F 3/12* (2006.01)

(52) U.S. Cl. ....... 358/1.13; 358/1.9; 358/1.18; 358/504; 358/434; 399/10; 399/45; 399/46; 399/85; 399/364

(58) Field of Classification Search .................. 358/1.1, 358/1.13, 501, 1.9, 1.18, 1.15, 434, 406, 358/405; 399/85, 46, 38, 54, 306, 309, 364, 399/76, 10, 82, 45, 53, 67, 79, 83, 84, 24, 399/66

See application file for complete search history.

(56) References Cited

U.S. PATENT DOCUMENTS

| | | | | |
|---|---|---|---|---|
| 5,884,120 A * | 3/1999 | Ito et al. | .......................... | 399/54 |
| 6,029,023 A * | 2/2000 | Munemori et al. | ............ | 399/66 |
| 6,625,403 B2 * | 9/2003 | Carling et al. | .................. | 399/24 |
| 6,865,355 B2 * | 3/2005 | Burkes et al. | .................. | 399/85 |
| 7,227,663 B1 * | 6/2007 | Yu | ................................ | 358/1.15 |
| 7,586,633 B2 * | 9/2009 | Urabe | .......................... | 358/1.15 |
| 7,676,171 B2 * | 3/2010 | Swantner et al. | ............... | 399/85 |
| 7,720,404 B2 * | 5/2010 | Wen et al. | ....................... | 399/82 |
| 7,778,555 B2 * | 8/2010 | Shoji et al. | ........................ | 399/9 |

(Continued)

FOREIGN PATENT DOCUMENTS

JP 09-197919 7/1997

(Continued)

OTHER PUBLICATIONS

Kajirai Yasuhiro, Printing controller, Printing control method and print system, JP 2001-312396, English Translation.*

*Primary Examiner* — Twyler Haskins
*Assistant Examiner* — Dennis Dicker
(74) *Attorney, Agent, or Firm* — DLA Piper LLP (US)

(57) ABSTRACT

There is provided a color page printer including a print engine operable by a color mode for executing color printing and a monochrome mode for executing monochrome printing, and a control unit for controlling the print engine to generate a printed paper having a content corresponding to received print data. The control unit is a unit equipped with a print number output section for outputting numbers of surfaces printed by a color mode and a monochrome mode of the print engine respectively as a number of color prints and a number of monochrome prints in an engine counter mode, numbers of surfaces printed based on print data for which color print is specified and print data for which monochrome print is specified respectively as a number of color prints and a number of monochrome prints in a driver specified counter mode, and a number of printing surfaces whose printed result was color and a number of printing surfaces whose printed result was monochrome respectively as a number of color prints and a number of monochrome prints in a real counter mode.

4 Claims, 6 Drawing Sheets

U.S. PATENT DOCUMENTS

2003/0011812 A1* 1/2003 Sesek et al. .................. 358/1.15
2006/0066884 A1* 3/2006 Kato ............................ 358/1.13

FOREIGN PATENT DOCUMENTS

| | | |
|---|---|---|
| JP | 11-295956 | 10/1999 |
| JP | 2001-312396 | 11/2001 |
| JP | 2001-341387 | 12/2001 |
| JP | 2004-334079 | 11/2004 |
| JP | 2005-084164 | 3/2005 |
| JP | 2007-008017 | 1/2007 |
| JP | 2007-008019 | 1/2007 |

* cited by examiner

FIG. 3

| | MONO | COLOR | TOTAL |
|---|---|---|---|
| SIMPLEX | PaperSizeSimplexCount-<br>Simplex_Color | PaperSizeProcessColorxCount-<br>PaperSizeProcessColorSimplexCount | PaperSizeSimplexCount |
| DUPLEX | Total_Duplex-<br>PaperSizeProcessColorSimplexCount | PaperSizeProcessColorSimplexCount | PaperSizeCount-<br>PaperSizeSimplexCount-<br>PaperSizeNullCount |
| TOTAL | PaperSizeCount-<br>PaperSizeProcessColorCount | PaperSizeProcessColorCount | PaperSizeCount |

FIG. 4

| | MONO | COLOR | TOTAL |
|---|---|---|---|
| SIMPLEX | PaperSizeSimplexCount-Simplex_Color | PaperSizeProcessColorxCount-PaperSizeProcessColorSimplexCount | PaperSizeSimplexCount |
| DUPLEX | Total_Duplex-PaperSizeProcessColorSimplexCount | PaperSizeProcessColorSimplexCount | PaperSizeCount-PaperSizeSimplexCount |
| TOTAL | PaperSizeCount-PaperSizeProcessColorCount | PaperSizeProcessColorCount | PaperSizeCount |

FIG. 5

Log Status Sheet 25 DEC 2006 21:35

| | |
|---|---|
| Printer Name | XXXXXXXX |
| Printer Serial Number | 0000 0000 0000 |
| Printer Install Date | 20 JAN 2005 |
| Print Date | 25 DEC 2006 |
| Total pages | 000000 |
| Color pages | 000000 |
| B/W pages | 000000 |
| Power On count | 200 |
| Sleep count | 100 |
| Last Printed Date | 20 NOV 2006 |
| Jam Count | 100 |

PORTIONS IN WHICH CONTENTS ARE CHANGED DEPENDING ON PRINT NUMBER OUTPUT MODE

Print of pages

| 0 | Mono | | | Color | |
|---|---|---|---|---|---|
| 0 | Total | Simplex | Duplex | Simplex | Duplex |
| A3 | | | | | |
| A4 | | | | | |
| A5 | | | | | |
| B4 | | | | | |
| B5 | | | | | |
| LT | | | | | |
| GLT | | | | | |
| EXE | | | | | |
| HLT | | | | | |
| GLG | | | | | |
| F4 | | | | | |
| LGL | | | | | |
| B | | | | | |
| A3W | | | | | |
| A3F | | | | | |
| A3+ | | | | | |
| POST | | | | | |
| RNCRD | | | | | |
| 4CARD | | | | | |
| Y0 | | | | | |
| Y4 | | | | | |
| Y6 | | | | | |
| K2 | | | | | |
| K3 | | | | | |
| CH3 | | | | | |
| CH4 | | | | | |
| C5 | | | | | |
| C6 | | | | | |
| C10 | | | | | |
| DL | | | | | |
| IB5 | | | | | |
| MON | | | | | |
| CTM | | | | | |

Print of mode [pages]

| | Simplex | Duplex | Total |
|---|---|---|---|
| Mono | | | |
| Color | | | |
| Total | | | |

Paper Type

| | Mono | Color | Total |
|---|---|---|---|
| Normal | | | |
| SemiThk | | | |
| Thick | | | |
| Thick W | | | |
| Thick N | | | |
| Transparency | | | |
| Ltrhead | | | |
| ExtraThk | | | |
| Coated | | | |

Paper Path

| | Count | | Count |
|---|---|---|---|
| MP | | Face Down | |
| LC1 | | Face Up | |
| LC2 | | Mail Box | |
| LC3 | | Other | |
| LC4 | | | |
| LC5 | | | |
| Env | | | |

Job

| | Job | page |
|---|---|---|
| ESC/Page | | |
| ESC/Page-Color | | |
| ESC/Page-S | | |
| PCL5 | | |
| PCL6 | | |
| ESC/P2 | | |
| FX | | |
| 1239X | | |
| PDF | | |
| Other | | |

Job Length

| | Job | page |
|---|---|---|
| 1-2Pages | | |
| 3-4Pages | | |
| 5-10Pages | | |
| 11-20Pages | | |
| 21-50Pages | | |
| 51-100Pages | | |
| >100Pages | | |
| Total | | |

Coverage

| | C | M | Y | K |
|---|---|---|---|---|
| Last Job Coverage [%] | | | | |
| Average Coverage Duty [%] | | | | |
| Estimated [pages] | | | | |

FIG. 6

| | MONO | COLOR | TOTAL |
|---|---|---|---|
| SIMPLEX | PaperSizeMonoCompleted | PaperSizeColorCompleted | PaperSizeSimplexCount |
| DUPLEX | PaperSizeMonoCompleted | PaperSizeColorCompleted | PaperSizeCount-<br>PaperSizeSimplexCount |
| TOTAL | PaperSizeCount-<br>PaperSizeProcessColorCount | PaperSizeProcessColorCount | PaperSizeCount |

COLOR PAGE PRINTER WITH COUNTER

BACKGROUND

1. Technical Field

The present invention relates to a color page printer.

2. Related Art

As is well known, a function for outputting a number of prints (number of printing surfaces) in color mode (operation mode for color printing) of a print engine and a number of prints in monochrome mode (operation mode for monochrome printing) of the print engine (function for printing a status sheet in which each number of prints is printed out and function for transmitting each number of prints to another device) is generally applied in a recent color page printer.

That is, information required for maintenance of the print engine (two types of numbers of prints) can be output in a general color page printer. However, a general color page printer is also a device that executes monochrome printing when print data for which color printing is specified is processed by operating the print engine by the monochrome mode or the color mode.

Consequently, in a general color page printer, the administrator can not recognize an actual using state (number of prints executed by specifying color printing by user, number of prints whose print result are monochrome, or the like) of the color page printer.

SUMMARY

An advantage of some aspects of the invention is to provide a color page printer which provides easy recognition of an actual using state thereof.

According to an aspect of the invention, there is provided a color page printer including a print engine operable by a color mode for executing color printing and a monochrome mode for executing monochrome printing, and a control unit for controlling the print engine to generate a printed paper having a content corresponding to received print data. The control unit is equipped with a print number output section for outputting numbers of surfaces printed by a color mode and a monochrome mode of the print engine respectively as a number of color prints and a number of monochrome prints in an engine counter mode, numbers of surfaces printed based on print data for which color print is specified and print data for which monochrome print is specified respectively as a number of color prints and a number of monochrome prints in a driver specified counter mode, and a number of printing surfaces whose printed result was color and a number of printing surfaces whose printed result was monochrome respectively as a number of color prints and a number of monochrome prints in a real counter mode.

That is, the color page printer according to the aspect of the invention is a device that can output not only the number of color prints and the number of monochrome prints in the engine counter mode (information output by a conventional color page printer), but also the number of color prints and the number of monochrome prints in the driver specified counter mode and the number of color prints and the number of monochrome prints in the real counter mode. Since each number of prints in the driver specified counter mode and the real counter mode is information that enables to recognize an actual using state of the color page printer, the color page printer is a device which makes it easy to recognize the actual using state.

In order to provide the color page printer according to an aspect of the invention, it is preferable to output each number of prints in each mode at the same time. However, required information is different by the using state that should be recognized. Accordingly, it is preferable that the control unit "further includes a reception section for receiving a specification by which any one of the engine counter mode, the driver specified counter mode, and the real counter mode is selected as a print number output mode, and the print number output section is a section for outputting the number of color prints and the number of monochrome prints only for the mode which is specified by the reception section as the print number output mode".

Further, when the print engine is a unit capable of printing to a plurality of types of papers different in size and the print number output section of the control unit is a section that outputs each number of prints in each mode for each of the plurality of types of papers, a color page printer by which the using stage can be finely recognized and a color page printer capable of outputting a number of prints about a plurality types of papers by a plain form can be provided.

Further, when the color page printer according to the aspect of the invention is provided as a device capable of double side printing (device in which a unit capable of double side printing is used), in order to also recognize a using state of the double side printing, it is preferable that the print number output section of the control unit is a section for outputting numbers of double side surfaces printed based on print data for which color printing and double side printing are specified and print data for which monochrome printing and double side printing are specified respectively as a number of color double side prints and a number of monochrome double side prints in the driver specified counter mode, and for outputting a number of double side printing surfaces whose printed result of at least one surface was color and a number of double side printing surfaces whose printed result of the both surfaces were monochrome respectively as a number of color double side prints and a number of monochrome double side prints in the real counter mode, and is a section for outputting a value in which a last surface of blank in the case of double side printing is counted and a value in which a last surface of blank in the case of double side printing is not counted respectively as each number of double side prints in the driver specified counter mode and each number of double side prints in the real counter mode.

Further each number of prints output by such a print number output section is specified from seven types of information. Then, if a number of information required for administration is reduced, a memory capacity required to provide the print number output section is also reduced. Accordingly, it is preferable that the print number output section having the above function is a section for administrating the seven types of information in order to output each number of prints in each mode.

BRIEF DESCRIPTION OF THE DRAWINGS

The invention will be described with reference to the accompanying drawings, wherein like numbers reference like elements.

FIG. 3 is a diagram illustrating a specification/calculation procedure of various numbers of prints in the case of a driver specified counter mode of the color page printer according to the embodiment.

FIG. 4 is a diagram illustrating a specification/calculation procedure of various numbers of prints in the case of a real counter mode of the color page printer according to the embodiment.

FIG. 5 is a diagram illustrating a status sheet printed by the color page printer according to the embodiment.

FIG. 6 is a diagram illustrating a specification/calculation procedure of various numbers of prints in the case of an engine counter mode of the color page printer according to the embodiment.

DESCRIPTION OF EXEMPLARY EMBODIMENTS

Hereinafter, a best mode for carrying out the invention will be described with reference to the accompanying drawings.

Figure 1:
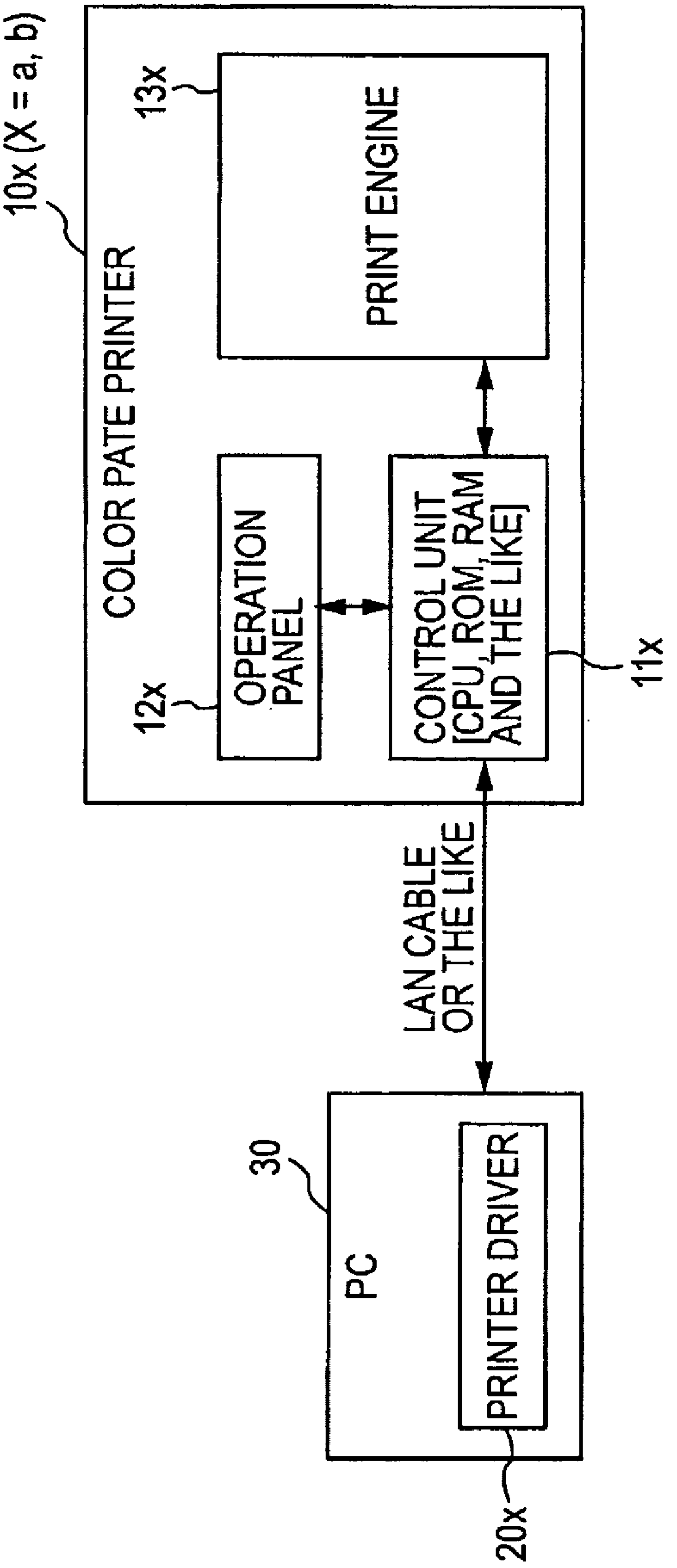
FIG. 1 is a diagram showing a structure of a color page printer according to an embodiment of the invention.
Figure 2:
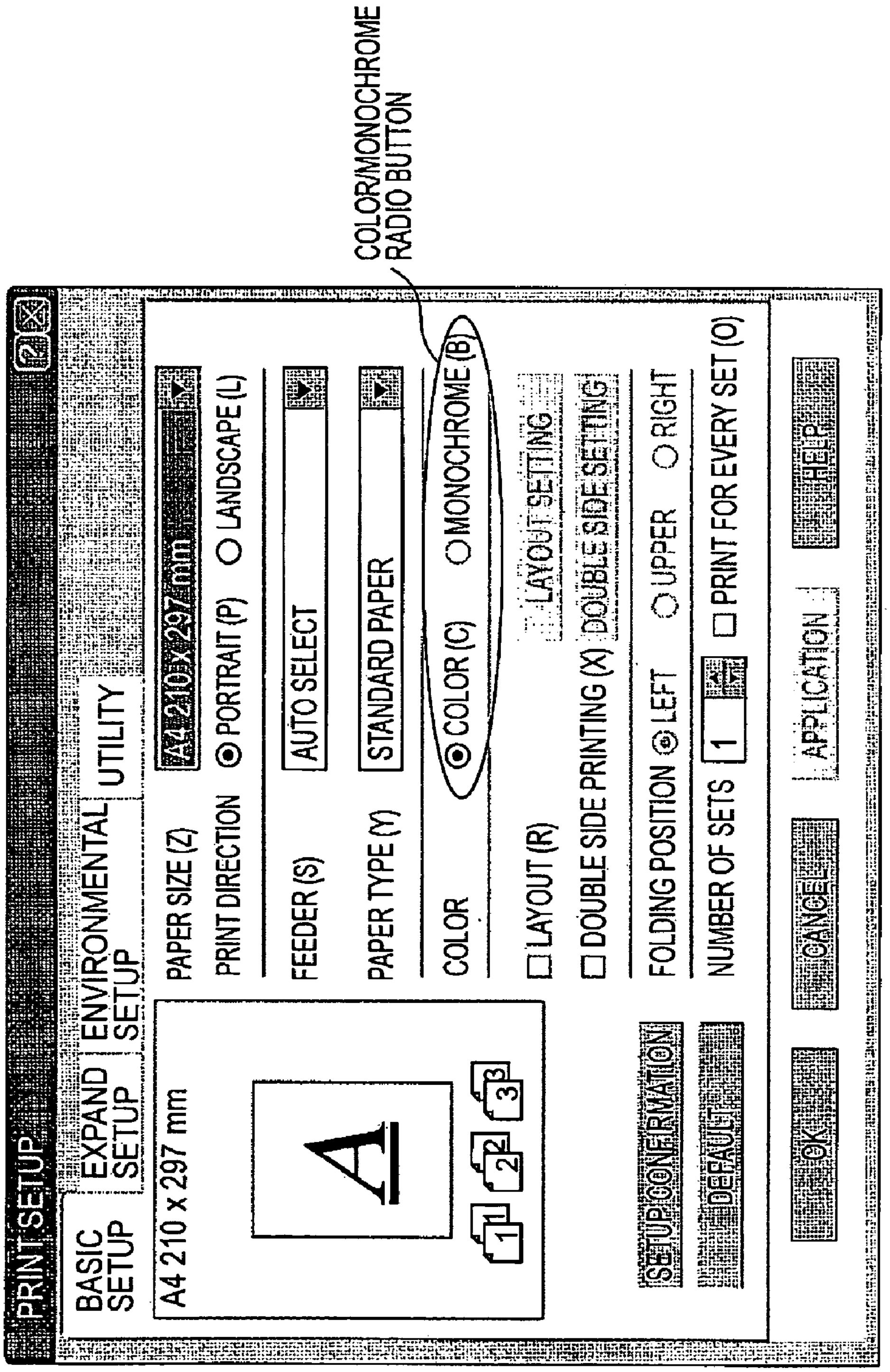
FIG. 2 is a diagram illustrating a window for print setup displayed by a printer driver for the color page printer according to the embodiment.

First, color page printers 10*a*, 10*b* according to an embodiment of the invention will be schematically described by using FIGS. 1 and 2.

As shown in FIG. 1, the color page printer 10*x* (x=a, b) according to the embodiment of the invention is a device equipped with a control unit 11*x*, an operation panel 12*x*, and a print engine 13*x*. Further, the color page printer 10*x* is a device that is connected to some PC's (personal computers) 30 in each of which a printer driver 20*x* is installed via various cables (LAN cable, USB cable) is installed to be used.

The operation panel 12*x* in each color page printer 10*x* is an interface unit between a user and the color page printer 10*x* (control unit 11*x*). Each operation panel 12*x* is a unit constituted by an LCD, a plurality of buttons (push button switches), and the like.

Each of the print engines 13*a*, 13*b* is a unit capable of double side printing that has an operation mode in which printing is executed by using only a K toner (hereinafter, referred to as monochrome mode) and an operation mode in which printing is executed by using C, M, Y, and K toners (hereinafter, referred to as color mode). However, the print engine 13*a* employs a tandem system and the print engine 13*b* employs a four cycle system.

The control unit 11*x* is a unit formed by a CPU, a ROM, a RAM, an EEPROM, an ASIC, various interface circuits, and the like for functioning the color page printer 10*x* as a device capable of one side/double side monochrome/color printing.

Each of the control units 11*a*, 11*b* is a unit capable of fixed color printing in which each page in print data for which color printing is specified is printed by the print engine 13 by the color mode and auto select printing in which each color page in print data for which color printing is specified is printed by the print engine 13 by the color mode and each monochrome page in print data for which color printing is specified is printed by the print engine 13 by the monochrome mode. However, the control unit 11*b* is a unit that executes the auto select printing as a general rule (as long as user does not change setup), whereas the control unit 11*a* is a unit that executes the fixed color printing as a general rule (as long as user does not change setup). Note that the print data for which color printing is specified means print data generated and transmitted by the printer driver 20*x* in which a color radio button on a window for print setup (window displayed by the printer driver 20*x*) shown in FIG. 2 is selected.

Hereinafter, the structure and operation of the color page printer 10*x* according to the embodiment will be further concretely described based on the above description.

The color page printer 10*x* according to the embodiment is a device which is improved from a conventional color page printer so as to be able to output various numbers of prints (number of color one side prints, number of monochrome one side prints, number of one side prints, number of color double side prints, number of monochrome double side prints, number of double side prints, and the like) for each paper size and so as to have a driver specified counter mode, a real counter mode, and an engine counter mode as a print number output mode. Note that the output of the numbers of prints is a process for printing a status sheet (the detail will be described below) in which various numbers of prints are printed, or a process for transmitting the number of prints (numerical number information) to an apparatus that required the number of prints, a process for transmitting HTML data (source data for Web page by which various numbers of prints can be confirmed) in which the number of prints is incorporated to an apparatus that required the number of prints.

The driver specified counter mode of the color page printer 10*x* according to the embodiment is a mode in which numbers of papers printed based on print data for which color printing is specified are output as various numbers of color prints (numbers of color prints of various paper sizes) and numbers of papers printed based on print data for which monochrome printing is specified are output as various numbers of monochrome prints. The driver specified counter mode is a mode in which the last page of blank in the case of double side printing is counted.

The real counter mode is a mode in which numbers of printing surfaces whose print result were color (number of surfaces which were printed with color by color mode) and numbers of printing surfaces whose print result were monochrome (number of surfaces which were printed by monochrome mode+number of surfaces which were printed with monochrome by color mode) are respectively output as various numbers of color prints and numbers of monochrome prints. The real counter mode is a mode in which the last page of blank in the case of double side printing is not counted.

The engine counter mode is a mode in which numbers of surfaces printed by the color mode of the print engine 13 and numbers of surfaces printed by the monochrome mode of the print engine 13 are respectively output as various numbers of color prints and numbers of monochrome prints. The engine counter mode is a mode in which the last page of blank in the case of double side printing is counted.

That is, each print number output mode is a mode in which each number of prints becomes the value shown by the table described below when the first, third, and fifth pages of print data with which printing is initially executed by the color page printer 10*x* are color pages and the second and fourth pages thereof are monochrome pages.

TABLE 1

| | page | | | | | print number output mode | | | | | |
|---|---|---|---|---|---|---|---|---|---|---|---|
| | | | | | | DM | | RM | | EM | |
| print condition | 1 | 2 | 3 | 4 | 5 | C | B | C | B | C | B |
| color (fixed color), one side | C | B | C | B | C | 5 | 0 | 3 | 2 | 5 | 0 |
| color (auto selection), one side | C | B | C | B | C | 5 | 0 | 3 | 2 | 3 | 2 |
| color, double side | C | B | C | B | C | 6 | 0 | 3 | 2 | 6 | 0 |

Note that in the above table, “DM, “RM”, and “EM” respectively denote the driver specified counter mode, the real counter mode, and the engine counter mode. Further “C” denotes color page or number of color prints and “B” denotes monochrome page or number of monochrome prints.

Then, the color page printer 10*x* according to the embodiment is a device which is constituted (the control unit 11*x* is programmed) so that an administrator can specify the print number output mode by operating the operation panel 12*x* (input of a password of the administrator is required in the case of modifying the print number output mode), and seven types of information such as PaperSizeMonoCompleted, PaperSizeColorCompleted, PaperSizeSimplexCount, PaperSizeProcessColorSimplexCount, PaperSizeNullCount, PaperSizeProcessColorCount, PaperSizeCount is administrated for every paper size and a number of prints in the present mode is calculated from the information when it becomes necessary to output the number of prints.

To be more specific, the control unit 11*x* of the color page printer 10*x* is a unit that requires input of a password of the administrator when the print number output mode is changed by the operation of the operation panel 12*x*.

Further, the control unit 11*x* is a unit that administrates (keeps and updates in the EEPROM) the information described below as PaperSizeMonoCompleted and the like.

The PaperSizeMonoCompleted, and PaperSizeColorCompleted administrated by the control unit 11*x* are respectively the number of surfaces printed by the print engine 13*x* by the monochrome mode and the number of surfaces printed by the print engine 13*x* by the color mode.

PaperSizeSimplexCount is the number of one side printing surfaces (the number of one side printing executed by the print engine 13*x*). PaperSizeProcessColorSimplexCount is the value in which "2" is added each time double side printing in which color printing is specified is completed for one time (each time printing is completed for each surface of one paper) (=the number of color double side prints in the driver specified counter mode).

PaperSizeNullCount is a value in which "1" is added at each time double side printing whose last page is blank is executed (=total executed number of double side printing whose last page is blank).

PaperSizeProcessColorCount is a value in which "2" is added each time double side printing in which color printing is specified is completed for one time, and "1" is added each time one side printing in which color printing is specified is completed for one time (=the number of color double side prints+the number of color one side printing surfaces in the driver specified counter mode). PaperSizeCount is a value in which "2" is added each time double side printing is completed for one time and "1" is added each time one side printing is completed for one time.

In fact, each information administrated in the control unit 11*x* is the one that can be used for calculating various numbers of prints (numbers of printing surfaces) in the driver counter specified mode when used in the form shown in FIG. 3. Note that "Mono", "Color", "Simplex", "Duplex" in FIG. 3 respectively denote monochrome printing, color printing, one side printing, double side printing, and "simplex_Color" and "Total_Duplex" respectively denote a number of monochrome prints of one side (PaperSizeProcessColorCount-PaperSizeProcessColorSimplexCount), and a number of double side prints of monochrome and color (PaperSizeProcessColorSimplexCount).

Further, each information is the one that can be used for calculating various numbers of prints in the real counter mode when used in the form shown in FIG. 4.

Then, PaperSizeMonoCompleted, and PaperSizeColorCompleted are numbers of prints itself which should be output by the engine counter mode. Accordingly, the control unit 11*x* is a unit that is constituted (programmed) so as to output the one shown in FIG. 3 as various numbers of prints when the driver specified mode is specified, output the one shown in FIG. 4 as various numbers of prints when the real counter mode is specified, and output PaperSizeMonoCompleted and PaperSizeColorCompleted as various numbers of prints when the engine counter mode is specified.

Note that the status sheet printed by the color page printer 10*x* (the status sheet that is printed by the print engine 13*x* by the control unit 11*x*) has a format as shown in FIG. 5. That is, the control unit 11*x* is a unit which also has a function to output a correction result of various numbers of prints by various conditions (total sum of numbers of prints of the same paper size, or the like; values shown inside the frames of upper left, left below, and right of FIG. 5).

Further, the number of double side prints is information indispensable for maintenance of the print engine 13, so that the control unit 11*x* makes the print engine 13 to print the status sheet in which the values shown in FIG. 6 are shown as each number of prints in the case where the engine counter mode is specified.

As is apparent form the above description, the color page printer 10*x* (x=a, b) according to the embodiment is a device that can output not only the number of color prints and the number of monochrome prints in the engine counter mode, but also the number of color prints and the number of monochrome prints in the driver specified counter mode and the number of color prints and the number of monochrome prints in the real counter mode. Since each number of prints in the driver specified counter mode and the real counter mode is information that enables to recognize an actual using state of the color page printer, the color page printer 10*x* is a device which makes it easy to recognize the actual using state.

MODIFICATIONS

Various modifications can be made to the aforementioned color page printer 10*x*. For example, the color page printer 10*x* can be modified to a device that outputs various numbers of prints in the three types of modes at the same time (device that prints out the status sheet in which all of various numbers of prints in the three types of modes or the like). However, information to be required is generally different in accordance with the using state for recognition. Accordingly, it is desirable to employ the aforementioned structure of the color page printer 10*x* (structure in which only the information about each mode is output).

Further, the color page printer 10*x* can be modified to a device that administrates information of not less than eight types (for example information groups formed by each of information output as numbers of prints in each mode) so as to be able to output various numbers of prints for each paper size in each mode. However, even when the color page printer 10*x* is modified to such a device, a memory capacity required to output various numbers of prints for each size in each mode is only increased. Accordingly, it is desirable to employ the aforementioned structure of the color page printer 10*x* (structure that administrates seven types of information for every paper size).

The entire disclosure of Japanese Patent Application No. 2007-139259, filed May 25, 2007 is expressly incorporated by reference herein.

What is claimed is:

1. A color page printer comprising;

a print engine operable by a color mode for executing color printing and a monochrome mode for executing monochrome printing; and a control unit for controlling the print engine to generate a printed paper having a content corresponding to received print data; wherein the control unit is a unit equipped with a print number output section for outputting numbers of surfaces printed by a color mode and a monochrome mode of the print engine respectively as a number of color prints and a number of monochrome prints in an engine counter mode, numbers of surfaces printed based on print data for which color print is specified and print data for which monochrome print is specified respectively as a number of color prints and a number of monochrome prints in a driver specified counter mode, and a number of printing surfaces whose printed result was color and a number of printing surfaces whose printed result was monochrome respectively as a number of color prints and a number of monochrome prints in a real counter mode, the print engine is a unit capable of double side printing, and the print number output section of the control unit is a section for outputting numbers of double side surfaces printed based on print data for which color printing and double side printing are specified and print data for which monochrome printing and double side printing are specified respectively as a number of color double side prints and a number of monochrome double side prints in the driver specified counter mode, and for outputting a number of double side printing surfaces whose printed result of at least one surface was color and a number of double side printing surfaces whose printed result of the both surfaces were monochrome respectively as a number of color double side prints and a number of monochrome double side prints in the real counter mode, and is a section for outputting a value in which a last surface of blank in the case of double side printing is counted and a value in which a last surface of blank in the case of double side printing is not counted respectively as each number of double side prints in the driver specified counter mode and each number of double side prints in the real counter mode.

2. The color page printer according to claim 1, wherein, the control unit further includes a reception section for receiving a specification by which any one of the engine counter mode, the driver specified counter mode, and the real counter mode is selected as a print number output mode, and wherein the print number output section is a section for outputting the number of color prints and the number of monochrome prints only for the mode which is specified by the reception section as the print number output mode.

3. The color page printer according to claim 1, wherein the print number output section of the control unit is a section for administrating seven types of information in order to output each number of prints of each mode.

4. The color page printer according to claim 1, wherein the print engine is a unit capable of printing to a plurality of types of papers different in size, and, the print number output section of the control unit is a section for outputting each number of prints of each mode for each of the plurality of types of papers.

* * * * *